(12) United States Patent
Powers

(10) Patent No.: US 6,558,571 B1
(45) Date of Patent: May 6, 2003

(54) OXYGEN-ABSORBING COMPOSITION AND METHOD

(75) Inventor: Thomas H. Powers, Mayville, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 261 days.

(21) Appl. No.: 09/637,975

(22) Filed: Aug. 11, 2000

(51) Int. Cl.[7] .................................................. C07B 3/00
(52) U.S. Cl. .................................................. 252/188.28
(58) Field of Search ...................... 252/186.24, 186.21, 252/186.43, 187.31, 188.28

(56) References Cited

U.S. PATENT DOCUMENTS

| | | |
|---|---|---|
| 4,384,972 A | 5/1983 | Nakamura et al. |
| 4,762,722 A | 8/1988 | Izumimoto et al. |
| 5,928,560 A | 7/1999 | DeDuca et al. |
| 6,209,289 B1 * | 4/2001 | Cullen .................... 53/432 |

OTHER PUBLICATIONS

See Typed Statement Attached.

* cited by examiner

*Primary Examiner*—Cephia D. Toomer
(74) *Attorney, Agent, or Firm*—Joseph P. Gastel

(57) ABSTRACT

An oxygen-absorbing composition including in relatively sufficient proportions a dry acid, iron, and an inhibited carbon dioxide generating compound. A method of absorbing oxygen from a closed environment including the steps of providing an oxygen-absorbing composition comprising in relatively sufficient proportions by weight a dry acid, iron and an inhibited carbon dioxide generating compound, and injecting water into said composition. An oxygen-absorbing packet including an oxygen-permeable packet containing an oxygen-absorbing composition including iron and an inhibited carbon dioxide generating compound.

40 Claims, No Drawings

OXYGEN-ABSORBING COMPOSITION AND METHOD

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to an improved oxygen-absorbing composition and method for absorbing oxygen from a closed container.

By way of background, the prior art includes an oxygen-absorbing composition which is activated by the injection of water or an acid, such as acetic acid. This is shown in U.S. Pat. No. 5,928,560 wherein an oxygen-sensitive product is contained in a flexible package, and a packet containing an oxygen-absorbing composition has water or an acid injected therein and placed in the package to absorb oxygen. The prior art composition includes iron, an electrolyte salt, such as sodium chloride, and a carbonate which releases carbon dioxide. However, the foregoing oxygen-absorbing composition and method had a serious drawback because incidental to the oxygen-absorption, hydrogen gas was generated which could bloat the flexible package containing the oxygen-sensitive product. It is with overcoming the foregoing deficiency of the prior art that the present invention is concerned.

BRIEF SUMMARY OF THE INVENTION

It is one object of the present invention to provide an improved oxygen-absorbing composition which rapidly absorbs oxygen without generating significant amounts of hydrogen.

Another object of the present invention is to provide an improved method of rapidly absorbing oxygen in a closed container without generating significant amounts of hydrogen gas. Other objects and attendant advantages of the present invention will readily be perceived hereafter.

The present invention relates to an oxygen-absorbing composition comprising iron and an inhibited carbon dioxide generating compound.

The present invention also relates to an oxygen-absorbing composition comprising in relatively sufficient proportions a dry acid, iron, a salt and an inhibited carbon dioxide generating compound.

The present invention also relates to a method of absorbing oxygen from a closed container comprising the steps of providing an oxygen-absorbing composition comprising in relatively sufficient proportions by weight iron, an inhibited carbon dioxide generating compound, injecting an acid into said composition, and inserting said oxygen-absorbing compound into said container.

The present invention also relates to a method of absorbing oxygen from a closed container comprising the steps of providing an oxygen-absorbing composition comprising in relatively sufficient proportions by weight a dry acid, iron, an inhibited carbon dioxide generating compound, injecting water into said composition, and inserting said oxygen-absorbing compound into said container The present invention also relates to an oxygen-absorbing product comprising an oxygen-permeable packet containing iron and an inhibited carbon dioxide generating compound.

The present invention also relates to an oxygen-absorbing product comprising an oxygen-permeable packet containing in relatively sufficient proportions a dry acid, iron, and an inhibited carbon dioxide generating compound.

The various aspects of the present invention will be more fully understood from a reading of the following portions of the specification.

DETAILED DESCRIPTION OF THE INVENTION

The composition and method of the present invention effect rapid absorption of oxygen from a closed container having an oxygen-sensitive product, such as meat, fish or other edible or non-edible material, without generating significant amounts of hydrogen.

In accordance with the present invention, a gas permeable packet containing the oxygen-absorbing composition of the present invention is placed in a package or container along with the oxygen-sensitive product which is to be protected from oxygen deterioration. The oxygen-absorbing composition is activated by the injection of water or an acid into the oxygen-permeable packet in which the oxygen-absorbing composition is contained, and the packet is then placed in the package containing the oxygen-sensitive product. The oxygen-permeable material of the oxygen-absorbing packet, such as (1) TYVEK (spun-bonded polyethylene) (2) microperforated materials and structures (3) oxygen permeable materials, such as acrylics, acetates and styrenes (4) porous materials, such as plain and treated papers and woven and nonwoven fabrics, will retain the oxygen-absorbing composition and the injected water or acid therein during the oxygen-absorption process wherein oxygen is absorbed from the closed package or container through the permeable packet.

At this point, as noted above, an oxygen-absorbing composition of the general nature including an acid, iron, an electrolyte salt and a carbon dioxide generating compound was known in the past, and such a composition was activated by the injection of water or an acid, such as acetic acid. However, the use of acetic acid had a number of drawbacks, namely, the acetic acid produced an undesirable odor, and the use of an acid in the injection equipment could be corrosive. Also, the acid caused the generation of hydrogen gas.

The heart of the present invention is the use of a composition containing an inhibited carbon dioxide generating compound, along with the other conventional components of the composition, namely, an electrolyte salt and iron. The composition can include a dry acid, or an acid solution can be injected. If the acid is in dry form, water is injected to activate it. When the acid is in dry form, it produces a liquid acid substantially instantaneously upon contact with injected water, thereby providing an acidic environment which enhances rapid oxygen-absorption. The acidic environment has an initial low pH of below about 3.5 which is achieved through the ready solubility of the acid component. Also, when a liquid acid solution is injected to a composition which does not contain a dry acid, the activation is rapid. Thus, there is rapid initial oxygen-absorption because of the rapid production of an acidic environment. The inhibited carbon dioxide generating compound, which is basic, does not generate carbon dioxide gas immediately with the rapid early oxygen-absorption, thereby permitting rapid oxygen-absorption to continue as the oxygen from the container is drawn into the permeable packet containing the oxygen-absorbing composition. However, after the inhibited carbon dioxide generating compound is subsequently activated, there are two results. Firstly, it provides further enhanced oxygen-absorbing action which is achieved through foaming produced by the generated carbon dioxide and expansion of the reaction mixture which provide greater surface area for contact between the oxygen-absorbing composition and the oxygen. Secondly, a less acidic environment is created after the initial rapid oxygen-absorption resulting from the solubility of the dry acid or the injection of a liquid acid, and this less acidic environment reduces the concentration of hydronium ions in solution to thereby inhibit the generation of hydrogen gas to insignificant levels within the oxygen-absorbing packet, which otherwise could then pass through the permeable packet and effect bloating of the container or package which contains the oxygen-sensitive product which is to be protected from oxygen deterioration. The activation of the inhibited carbon dioxide generating composition in the later stages of oxygen-absorption effects neutralization of the acid by raising the pH to about 4 or above.

Stated otherwise, there are two effects resulting from using an inhibited carbon dioxide generating component with the injecting of an acid or injecting water to activate a dry soluble acid. The first effect is that the acid is immediately soluble upon water injection or upon the injection of liquid acid to effect immediate oxygen-absorption. This is in contrast to the use of a less soluble acid which does not produce immediate oxygen-absorption. The second effect is that the inhibited carbon dioxide generating compound, such as sodium bicarbonate which is inhibited, provides a foaming effect after the initial oxygen-absorption. The sodium bicarbonate provides the foaming effect which expands the reaction mixture, that is, it improves the reactivity of the mixture to absorb oxygen as the continuance of the initial rapid oxygen-absorption resulting from the presence of the acid. This oxygen-absorption during the foaming produced by carbon dioxide gas occurs while the pH of the composition is raised from the initial acidic value of below about 3.5 to the pH of above about 4 due to the buffering effect of the sodium bicarbonate, and it is this buffering effect which reduces the concentration of hydronium ions to thereby prevent the generation of the hydrogen gas. In other words, the foregoing composition results in rapid oxygen-absorption while the pH is lower at below about 3.5, and when the pH shifts upward to about 4 or above, the side reaction of hydrogen generation is inhibited.

In the foregoing type of reaction the oxygen-absorbing composition absorbs all of the oxygen from the closed container containing the oxygen-sensitive product when the oxygen-absorbing composition has more than sufficient capacity to absorb all of the available oxygen, and it then seeks to reduce any other reducible element or compound that is present. This occurs because there is usually an excess of oxygen-absorbing composition present to insure that all of the oxygen in the container is absorbed. What could therefore occur is that the oxygen-absorbing composition reduces the hydronium ion to produce hydrogen gas after all of the oxygen is absorbed. However, the advantage of the formulation using an inhibited carbon dioxide generating compound is that before all of the oxygen is absorbed, the pH has shifted upward so that the hydronium ion concentration is reduced to the point where the reduction of the hydronium ion is either too slow or too low in concentration to be relevant, thereby preventing the generation of hydrogen gas which could create the bloating of a flexible package.

At this point it must be mentioned that while a highly soluble acid, such as malic acid, is preferred in the dry composition, slower acting acids, such as fumaric acid, can also be used, but with less efficiency. However, the salient feature of the present composition is the use of an inhibited carbon dioxide generating component which results in delayed carbon dioxide generation and delayed neutralization of the acid. Thus, rapid oxygen-absorption occurs due to the acidic environment, but hydrogen gas generation is prevented because of the inhibited action of the carbon dioxide generating compound which later provides a less acidic environment.

As noted briefly above, one embodiment of the oxygen-absorbing composition of the present invention comprises in relatively sufficient proportions a dry acid, iron, an electrolyte salt, and an inhibited carbon dioxide generating compound. In addition, it can also include a water-absorbing agent and a wicking agent. Also, as noted above, the composition can include only iron and the inhibited carbon dioxide generating compound, and such composition can be activated by the injection of liquid acid if the carbon dioxide generating compound also acts as an electrolyte salt.

The iron of the composition may be any suitable type of iron including electrolytically reduced iron, hydrogen reduced iron, carbonyl iron, or any other suitable iron or other oxidizable metal, such as zinc, copper and tin, and preferably annealed electrolytically reduced iron. The iron can be present by weight in an amount of between 20% and 90% and more preferably between about 40% and 70%, and preferably between 50% and 60%. The iron is preferably in grannular form and can be of a U.S. mesh size of between 50 and 600 and more preferably between about 100 and 300 and most preferably between about 150 and 200.

The salt which produces an electrolyte may be any alkali metal or transition metal halide or any other salt capable of functioning as an electrolyte and preferably can be sodium chloride. The salt can be present by weight in an amount of between 0.10% to 1%, and more preferably between about 1% and 5%, and most preferably between about 2% and 3%. However, it will be appreciated that under certain circumstances an electrolytic salt may not be needed when the foaming agent is used because the foaming agent can act as an electrolyte.

In accordance with a preferred aspect of the present invention, a highly soluble dry acid is utilized in the composition so that when the oxygen-absorbing composition is injected with water, there will be a substantially immediate acidic environment for rapid oxygen-absorption. The preferred acid is dry malic acid which may be present by weight in an amount of between about 3% and 40% and more preferably between about 10% and 30%, and most preferably between about 15% and 20%. The malic acid is one of the many organic acids or acid anhydrides suitable for this formula. Other acids may include citric, acetic, diacetic, oxalic, tartaric, succinic, acrylic, phthalic and adipic acids. Inorganic acids may also be used including, without limitation, sulfuric, nitric and phosphoric acids. In addition, acid salts of these and other acids may be used. Additionally, fatty acids, such as propionic, butyric, caprylic, oleic and arachidonic acids may be used. Also, sugar acids, such as gluconic and galacturonic may be used and amino acids, such as glycine, alanine, leucine, phenylalanine, tyrosine and cysteine may be substituted. It will be appreciated that the rapidity of the acidic environment production will be a function of the solubility and the strength of the acids. Additionally, the amounts of substitute acids which can be used instead of malic acid would depend on their relative solubility and degree of ionization with respect to the solubility and ionization of the amounts of malic acid listed above.

It will also be appreciated that less soluble acids may be used including fumaric, tartaric, butyric and amino-type acids. However, if such acids are used, the oxygen-absorption will not be as rapid as when the more soluble acids are used.

Also, as noted above, the composition need contain only iron and the inhibited carbon dioxide generating compound if the activation is to be by the injection of a liquid acid when the carbon dioxide generating compound also acts as an electrolyte salt. However, it is preferable that the composition contain a separate electrolyte salt.

As noted briefly above, the heart of the present invention is the use of an inhibited carbon dioxide generating compound which will not generate carbon dioxide until there has been an effective efficient and rapid oxygen-absorption due to the fact that the initial pH of the composition after water or liquid acid injection is rapidly achieved at a pH of below about 3.5. However, the preferred pH is between 2 and 3. It is after an initial period of maintaining the pH at the foregoing level that the inhibited carbon dioxide generating compound becomes effective to both buffer the solution to neutralize the solution by raising the pH to about 4 or above and also generate carbon dioxide gas which, as explained above, produces foaming and expansion of the reaction mixture to continue oxygen-absorption but at a much slower rate. The partial neutralization occurs because the preferred sodium bicarbonate in the presence of water produces sodium ions and bicarbonate ions, and the bicarbonate ions combine with the free hydrogen in the acidic solution to produce carbonic acid which immediately breaks down into water and carbon dioxide gas, thereby effectively preventing the hydrogen ions from forming hydrogen gas which can produce the above-discussed bloating of a flexible package. The amount of carbon dioxide which is produced is limited by the amount of inhibited sodium bicarbonate present so that it does not produce bloating.

The preferred inhibited carbon dioxide compound is encapsulated sodium bicarbonate which may be present by weight of the total composition in an amount of between 1% and 30%, and more preferably between 2% and 20%, and most preferably between about 5% and 10%. In addition to the inhibited sodium bicarbonate, other inhibited carbonates and bicarbonates may be used. These include without limitation inhibited sodium carbonate, inhibited potassium carbonate, and inhibited potassium bicarbonate. Also, calcium carbonate and magnesium carbonate could be used, but without the efficiency of the other carbon dioxide generating compounds. All of these compounds should either be encapsulated or otherwise limited in their rate of reaction by being coated with an inhibiting agent.

Stated another way, when sodium bicarbonate is used, it should be present by weight per total weight of formula in a range of between about 0.03 to 0.5 grams per gram of formula and more preferably between about 0.05 to 0.2 grams per gram of formula and most preferably between 0.1 to 0.12 grams per gram of formula. Additionally, the amount of sodium bicarbonate for the purpose of absorbing oxygen in a closed package may be present in an amount of grams per cubic centimeter of package volume in the amount of between 0.001 to 0.3 and more preferably between 0.01 to 0.1 and most preferably between 0.03 to 0.05.

Encapsulated sodium bicarbonate products which have been used satisfactorily are commercially available under the trademarks CAP-SHURE and BAKER'S LABEL. The CAP-SHURE encapsulated sodium bicarbonate is a product of Balchem Corporation of Slate Hill, N.Y. It is sodium bicarbonate coated with partially hydrogenated vegetable oil. It is granular and the particles contain 68% to 72% sodium bicarbonate with a hydrogenated vegetable oil coating of between 28% and 32%. The size of the particles is such that 2% will be retained on a USSS #14 mesh screen. The BAKER'S LABEL encapsulated sodium bicarbonate is a product of DCV Food Ingredients which is a Division of DCV, Inc. of Wilmington, Del. This compound is a microencapsulated small particle size baking soda. It is a white free-flowing granular substance having no odor and comprising primarily sodium bicarbonate in an amount of 95% having a shell composition of hydrogenated vegetable oil, and the particle size is such that 98% will pass through a 20 mesh screen. Other inhibited carbonates or bicarbonates or other types of inhibited carbon dioxide generating compounds may be used.

The inhibited carbon dioxide generating product may be, without limitation, any of the above mentioned carbonates or bicarbonates, such as sodium bicarbonate, sodium carbonate, potassium carbonate and potassium bicarbonate, which have been coated with vegetable oil or another suitable animal oil, mineral oil, dextrin starch, vegetable gum, plant protein, animal protein or complex carbohydrate.

In addition, the composition may include a water adsorbing agent, such as silica gel, in the amount by weight of between about 0.1% and 20% and more preferably between about 1% and 10% and most preferably between 4% and 8%. Other water absorbing agents, such as molecular sieve, zeolite, carbon and clay may be used. The water absorbing agent functions to disperse water throughout the reaction mixture to enhance the rate and completeness of the reaction.

In addition, a wicking agent may be used to rapidly distribute the injected water throughout the composition for efficient oxygen-absorption. Such a wicking agent may be powdered cellulose which may be present by weight in an amount of between 2% and 30% and more preferably between 5% and 20% and most preferably between 8% and 12%. The powdered cellulose is preferably of a particle size of between 5 and 300 microns, but any suitable powdered cellulose may be used. Additionally, other wicking agents which may be used may be soluble fiber, starches and vegetable gums.

The above-described product is preferably packaged in an oxygen-permeable TYVEK packet of the general types shown in U.S. Pat. Nos. 4,992,410 and 3,990,872 which are incorporated herein by reference. However, the packet can be of any suitable shape, and it can also be of any suitable oxygen-permeable material, as discussed broadly above. The weight of the formula which is used depends on the volume of the container from which oxygen is to be absorbed. The weight of the formula would therefore be as stated above, and the packet wold be of a size to contain the desired amount of formula. A measured amount of water is injected into the packet by means of a needle to activate the formula, and the packet is thereafter inserted into the container from which oxygen is to be absorbed.

A preferred formula which has been made includes by weight elemental iron 60%, sodium chloride 2%, malic acid 15%, encapsulated sodium bicarbonate 8%, silica gel 5% and powdered cellulose 10%. The encapsulated sodium bicarbonate was the CAP-SHURE product described above.

While preferred embodiments of the present invention have been disclosed, it is to be understood that it is not limited thereto but may be otherwise embodied within the scope of the following claims.

What is claimed is:

1. A method of absorbing oxygen from a closed environment comprising the steps of providing an oxygen-absorbing composition comprising in relatively sufficient proportions by weight a dry acid, iron, an inhibited carbon dioxide generating compound, and injecting water into said composition.

2. A method as set forth in claim 1 wherein said composition includes a water-adsorbing agent and a wicking agent.

3. A method as set forth in claim 1 wherein said inhibited carbon dioxide generating compound comprises an encapsulated carbonate or bicarbonate salt.

4. A method as set forth in claim 1 wherein said iron is present in an amount of between about 20% and 90%, said dry acid is present in an amount of between about 3% and 40%, said inhibited carbon dioxide generating compound is present in an amount of between about 1% and 30%.

5. A method as set forth in claim 1 wherein said iron is present in an amount of between about 40% and 70%, said dry acid is present in an amount of between about 10% and 30%, said inhibited carbon dioxide generating compound is present in an amount of between about 2% and 20%.

6. A method as set forth in claim 1 wherein said iron is present in an amount of between about 50% and 60%, said dry acid is present in an amount of between about 15% and 20%, said inhibited carbon dioxide generating compound is present in an amount of between about 5% and 10%.

7. An oxygen-absorbing composition comprising in relatively sufficient proportions a dry acid, iron, and an inhibited carbon dioxide generating compound.

8. An oxygen-absorbing composition as set forth in claim 7 wherein said inhibited carbon dioxide generating compound is an encapsulated carbonate or bicarbonate salt.

9. An oxygen-absorbing composition as set forth in claim 7 wherein said composition includes a water-adsorbing agent and a wicking agent.

10. An oxygen-absorbing composition as set forth in claim 7 wherein said iron is present in an amount of between about 20% and 90%, said dry acid is present in an amount of between about 3% and 40%, said inhibited carbon dioxide generating compound is present in an amount of between about 1% and 30%.

11. An oxygen-absorbing composition as set forth in claim 7 wherein said iron is present in an amount of between about 40% and 70%, said dry acid is present in an amount of between about 10% and 30%, said inhibited carbon dioxide generating compound is present in an amount of between about 2% and 20%.

12. An oxygen-absorbing composition as set forth in claim 7 wherein said iron is present in an amount of between about 50% and 60%, said dry acid is present in an amount of between about 15% and 20%, said inhibited carbon dioxide generating compound is present in an amount of between about 5% and 10%.

13. A method of absorbing oxygen from a closed container comprising the steps of providing an oxygen-absorbing composition comprising in relatively sufficient proportions by weight iron, an inhibited carbon dioxide generating compound, and injecting an acid into said composition.

14. A method as set forth in claim 13 wherein said composition includes a water-adsorbing agent and a wicking agent.

15. A method as set forth in claim 13 wherein said inhibited carbon dioxide generating compound comprises an encapsulated carbonate or bicarbonated salt.

16. A method as set forth in claim 13 wherein said iron is present in an amount of between about 20% and 90%, said acid is present in a dry state in an amount of between about 3% and 40%, said inhibited carbon dioxide generating compound is present in an amount of between about 1% and 30%.

17. A method as set forth in claim 13 wherein said iron is present in an amount of between about 40% and 70%, said acid is present in a dry state in an amount of between about 10% and 30%, said inhibited carbon dioxide generating compound is present in an amount of between about 2% and 20%.

18. A method as set forth in claim 13 wherein said iron is present in an amount of between about 50% and 60%, said acid is present in a dry state in an amount of between about 15% and 20%, said inhibited carbon dioxide generating compound is present in an amount of between about 5% and 10%.

19. An oxygen-absorbing composition comprising iron and an inhibited carbon dioxide generating compound.

20. An oxygen-absorbing composition as set forth in claim 19 wherein said inhibited carbon dioxide generating compound is an encapsulated carbonate or bicarbonate salt.

21. An oxygen-absorbing composition as set forth in claim 19 wherein said composition includes a water-adsorbing agent and a wicking agent.

22. An oxygen-absorbing product comprising an oxygen-permeable packet containing iron and an inhibited carbon dioxide generating compound.

23. An oxygen-absorbing product as set forth in claim 22 including a dry acid in said packet.

24. An oxygen-absorbing product as set forth in claim 23 wherein said iron is present in an amount of between about 20% and 90%, said dry acid is present in an amount of between about 3% and 40%, said inhibited carbon dioxide generating compound is present in an amount of between about 1% and 30%.

25. An oxygen-absorbing product as set forth in claim 23 wherein said iron is present in an amount between about 40% and 70%, said dry acid is present in an amount of between about 10% and 30%, said inhibited carbon dioxide generating compound is present in an amount of between about 2% and 20%.

26. An oxygen-absorbing product as set forth in claim 23 wherein said iron is present in an amount of between about 50% and 60%, said dry acid is present in an amount of between about 15% and 20%, said inhibited carbon dioxide generating compound is present in an amount of between about 5% and 10%.

27. An oxygen-absorbing product comprising an oxygen-permeable packet containing in relatively sufficient proportions a dry acid, iron, and an inhibited carbon dioxide generating compound.

28. An oxygen-absorbing product as set forth in claim 27 wherein said inhibited carbon dioxide generating compound is an encapsulated carbonate or bicarbonate salt.

29. An oxygen-absorbing product as set forth in claim 27 wherein said iron is present in an amount of between about 20% and 90%, said dry acid is present in an amount of between about 3% and 40%, said inhibited carbon dioxide generating compound is present in an amount of between about 1% and 30%.

30. An oxygen-absorbing product as set forth in claim 27 wherein said iron is present in an amount of between about 40% and 70%, said dry acid is present in an amount of between about 10% and 30%, said inhibited carbon dioxide generating compound is present in an amount of between about 2% and 20%.

31. An oxygen-absorbing product as set forth in claim 30 wherein said iron is present in an amount of between about 50% and 60%, said dry acid is present in an amount of between about 15% and 20%, said inhibited carbon dioxide generating compound is present in an amount of between about 5% and 10%.

32. A method of absorbing oxygen from a closed environment comprising the steps of providing an oxygen-absorbing composition comprising in relatively sufficient proportions by weight a dry acid, an oxidizable metal, an inhibited carbon dioxide generating compound, and injecting water into said composition.

33. A method as set forth in claim 32 wherein said composition includes a water-adsorbing agent and a wicking agent.

34. A method as set forth in claim 32 wherein said inhibited carbon dioxide generating compound comprises an encapsulated carbonate or bicarbonate salt.

35. An oxygen-absorbing composition comprising in relatively sufficient proportions a dry acid, an oxidizable metal, and an inhibited carbon dioxide generating compound.

36. An oxygen-absorbing composition as set forth in claim 35 wherein said inhibited carbon dioxide generating compound is an encapsulated carbonate or bicarbonate salt.

37. An oxygen-absorbing composition as set forth in claim 35 wherein said composition includes a water-adsorbing agent and a wicking agent.

38. An oxygen-absorbing composition comprising an oxidizable metal and an inhibited carbon dioxide generating compound.

39. An oxygen-absorbing composition as set forth in claim 38 wherein said inhibited carbon dioxide generating compound is an encapsulated carbonate or bicarbonate salt.

40. An oxygen-absorbing composition as set forth in claim 38 wherein said composition includes a water-adsorbing agent and a wicking agent.

* * * * *